United States Patent Office 3,585,263
Patented June 15, 1971

3,585,263
MELT-EXTRUSION OF OXIDIZABLE MELT WITH AGENT RELEASING NON-OXIDIZING GASES
Nestor Slyvain Rassart, Drummondville, Quebec, Canada, assignor to Chemcell Limited, Montreal, Quebec, Canada
No Drawing. Filed Feb. 6, 1969, Ser. No. 798,578
Int. Cl. B28b 3/20
U.S. Cl. 264—176          5 Claims

ABSTRACT OF THE DISCLOSURE

A melt-extrusion process having reduced tendency to oxidize an oxidizable melt-extrudable fragmented polymeric material, the improvement which comprises feeding in a melt-extrusion apparatus at least one oxidizable melt-extrudable polymeric material in fragments and an agent releasing between about room temperature and 50° C. below the softening point of said polymeric material, non-oxidizing gases, said polymeric material fragments being impermeable to said agent and said non-oxidizing gases. This process is particularly suitable for the melt-extrusion of stereoregular polyolefin, especially polypropylene, into products having funicular structure.

---

This invention relates to a continuous process for the stable melt-extrusion of melt-extrudable polymeric materials which are oxidizable during extrusion processes.

During melt-extrusion, the rate of oxidation of melt-extrudable polymeric materials which are oxidizable, gradually increases as the polymeric materials are brought to their melting temperature. The polymeric materials degenerate int he presence of the ambient oxygen to low-molecular weight gels discolored condensates and the like, and eventually clog up the filters which generally precede the die or spinnerets. Even these extrusion orifices are sometimes filled with the degenerated polymeric materials. As a result of the reduced passage, the delivery rate gradually decreases and higher pressure builds up within the extrusion apparatus. (Measurement of the degree of reduced passage may be measured indirectly by taking the pressure exerted on the feeding screw by the polymeric materials, as is well known. Instruments for this purpose are available, for instance, from Honeywell or Leads & Northrup. This pressure is often referred to as the screw thrust). Occasionally, the degenerated material may be forced through the filters and even the spinneret orifices as a result of the increased pressure. These materials thus become a part of the extruded strand leading to inferior, inhomogeneous products. Moreover, the variation is screw thrust resulting from the periodic, irregular passage of inhomogeneities requires extensive and highly accurate compensatory control equipment to avoid undesirable geometry—e.g. denier—variations in the extrudate. To partially overcome this problem, a plethora of antioxidants, also called stabilizers, have been invented. They are, however, but a partial remedy to the situation.

There has now been found a melt-extrusion process having reduced tendency to oxidize and oxidizable melt-extrudable fragmented polymeric material, the improvement which comprises feeding in a melt-extrusion apparatus at least one oxidizable melt-extrudable polymeric materials in fragments and an agent, releasing between about room temperature and 50° C. below the softening point of said polymeric material, non-oxidizing gases, said polymeric material fragments beinb impermeable to said agent and said non-oxidizing gases, whereby prior to the melting of said fragments, but during heating of the said fragments, the said agent releases the said non-oxidizing gases which move in between and around said fragments, the said fragments being unmolten, but upon further heating, the fragments melt and thereby offer substantially a gas impermeable zone, which compels said non-oxidizing gases to move away from the melting zone into said unmolten fragments and thus to sweep away oxidizing gases adjacent to said melting zone. After the melting in said melting zone, the molten fragments generally move away from the zone containing the unmolten fragments, to be shaped by conventional means into products, for instance, funicular products.

The agent must release the non-oxidizing gases between room temperature and 50° C. below the softening point of the polymeric material fragments. If the temperature at which the gases are released is too high, the polymeric material fragments will melt and trap at least a portion of said gases which are extruded with the molten polymeric material, the gases becoming foaming agents. If, on the contrary, the temperature at which the gases are released is too low, the reaction will proceed either outside the extrusion apparatus or in the extrusion apparatus but too far away from the zone where the polymeric material fragments melt.

Thus, generally, as the agent releasing non-oxidizing gases enters the extrusion apparatus with the oxidizable melt-extrudable polymeric material fragments, the heat given off by the extrusion apparatus gradually raises the temperatue of the fragments and of the agent and successively the following occurs: The agent decomposes and surrounds the fragments, sweeping off oxidizing gases. After the agent decomposition ends or nearly ends, the fragments soften in the non-oxidizing surroundings and melt, forming a melting zone. It is the non-oxidizing gases which continuously "sweep" the oxidizing gases which prevent the oxidation of the polymeric substance and the consequential clogging of the filters and/or extrusion orifices. Generally speaking, fully volatile substances, such as ammonium bicrabonate or ammonium carbonate, have been found to work as well comparatively to other substances yielding residues. In the presence of an amount of generated inert gas, it has been found that the screw thrust remains nearly constant for extended extrusion periods, yielding a uniform product.

This process is particularly useful for the continuous process involving the melt-extrusion of fragments such as polypropylene fragments into products having funicular structure where a substantial reduction of gels and other degradation products is obtained, characterized by products having substantial denier uniformity. The word "fragment" in the expression "polymeric material fragments" includes grains, granules, fines, powder and the like, and implies polymeric material being non-continuous, i.e. having voids in between particles through which gases may be allowed to substantially move by opposition to "continuous" polymeric material through which gases may not significantly circulate, such as in molten polymeric material.

By oxidizable melt-extrudable polymeric material is meant any polymeric material which is generally melt-extrudable and which experiences degradation or decomposition at high temperature due to its oxidation by the ambient oxygen of the atmosphere. It includes, for instance, polyolefins such as polyethylene, polypropylene, poly(3-methyl-butene-1), poly(4-methyl-pentene-1), and the like; polyacetals, polyesters, polyamides and cellulose esters such as cellulose acetate but is not limited to these as is well known to those skilled in the art. Throughout the specification, this expression is also meant to include polymeric compositions comprising additives, pigments and stabilizers, generally used during melt-extrusion. The agent delivering non-oxidizing gases is generally blended or mixed with the polymeric material fragments. The blend or mixture is then fed into a conventional melt-extrusion apparatus suitable for the extrusion of said blend or mixture.

BLOWING AGENT

The agents releasing non-oxidizing gases which may be employed are solids or liquids which liberate inert gaseous products above room temperature but about 50° C. lower than the softening point of the polymeric material. The liberation may occur by vaporization (physical agents), decomposition or chemical reaction (chemical agents). The fragments must be impermeable to the gases which are liberated or the agent releasing non-oxidizing gases, that is the gases and the agent should have very little tendency to dissolve into the fragments, or to adhere to or be absorbed on or absorbed into. For instance, the use of benzene or toluene as volatile liquids with polypropylene should be excluded to prevent foaming products. Instead, water, and preferably methanol or ethanol, could be selected.

Among the agents releasing non-oxidizing gases, which might be used are, for example:

(1) CO$_2$ Yielding products:

(i) the organic carbonates such as ammonium bicarbonate, sodium bicarbonate, ammonium carbonate and ammonium carbamate; mixtures of ammonium carbonate and sodium nitrile;

(ii) the organic compounds generating CO$_2$ such as ethylene carbonate

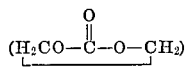

oxalates (urea oxalate; 1,1'-dithiodiformamidine; oxamic acid and its methyl and ethyl esters).

(2) Nitrogen or ammonia yielding compounds, such as:

(i) inorganic nitrites like NH$_4$NO$_2$;
(ii) organic nitrites like alkylamine nitrite (RNH$_2$HNO$_2$)

and amidine nitrite; urea, and urea derivatives such as amino-guanylurea; amino-guanidine bicarbonate; N-nitro-N'-cyclohexylurea; N-nitroguanidine; N-nitrourea; triazine; arylazosulfones; azonitriles; azobisformamides; hydrazine salts; hydrazones such as salicylaldehyde hydrogen; hydrazides such as disulfonyl dihydrazides; semicarbazides such as 4,4-oxybis(benzenesulfonyl semi-carbazide).

(3) SO$_2$ Yielding compounds such as:

NaHSO$_3$, (NH$_4$)$_2$SO$_3$; (NH$_4$)HSO$_3$ (4) Hydrogen yielding compounds may also be used if necessary. These compounds should be handled with great care, however, as they may in some conditions be explosive, as is well known to those skilled in the art. The hydrogen around the extrusion apparatus should be kept below 4%. Hydrogen yielding compounds include alkaliborohydrides and silicon oxyhydrides.

(5) Volatile liquids such as alcohols, methanol, ethanol, acetone, methyl ethyl ketone, ethyl acetate, methyl chloride, ethyl chloride, chloroform, methylene chloride, methylene bromide, and, in general, fluorine containing liquid volatile hydrocarbons. When a volatile liquid is used, a regeneration system is obtained whereby the liquid vaporizes and moves away from the melting zone into the fragments where it condenses back into the liquid form which then moves towards the melting zone to be re-vaporized, and so on. When such a regeneration system exists, after an initial amount of volatile liquid, just enough liquid should be added to compensate for the loss, bearing in mind the re-cycling operation.

(6) Other agents releasing non-oxidizing gases and mixtures thereof.

The agent releasing non-oxydizing gases should be residue free or leave very little residue. The residue should not interfere with the characteristics desired of the end product. For instance, the agent, or the gases resulting therefrom, which impart objectionable color, should be discarded.

VARIABLE FACTOR: THE AMOUNT

The amount of agent releasing non-oxidizing gases which may be used is the function of the nature of the said agent, its rate of decomposition or vaporization, the volume it occupies when the gases are given off and the temperature of decomposition or vaporization. The agent should be enough to constantly sweep off the oxygen from the melting zone. This precises the lower limit. The upper limit should be set by the necessity to completely remove the liberated gaseous products in excess, or the over-pressure through the unmolten fragments. This, of course, depends upon the throughput of the machine, the space between the fragments, the length of the path of the fragments and the pressure in the machine. Generally the extrusion is conducted under vacuum.

VACUUM

The vacuum must be high enough to ensure complete removal of non-oxidizing gases generated chemically, considering pressure of composition and space between polymer particles in the processing condition. The higher the amount of gas forming agent, the higher should be the vacuum to draw off the gases.

Numerous chemical agents releasing non-oxdizing gases also generate water vapor. In order to ensure good flowing properties of the extrusion mixture when using small fragments, water steam may not be allowed to condense, and to remove water, the pressure in the extrusion apparatue is generally reduced by reducing the pressure in the extrusion hopper. Vacuum is adjusted so that dew point cannot be reached, depending on water content and temperature of the extrusion mixture. (A vacuum of 20 inches of mercury for the extrusion of polypropylene powder has generally been found satisfactory to remove water as steam.)

The following examples will no serve to illustrate particular embodiments of my invention.

EXAMPLE I 18.25 gram of ammonium bicarbonate, NH$_4$HCO$_3$, to be used as an agent releasing non-oxidizing gases, was first ground in a mortar, then mixed with 51.3 gram of pigment and finally blended in a conaform mixer with 18 lb. of isotactic polypropylene, sold under the trademark "MOPLEN MF–12" and 2 lb. of a polypropylene stabilizer known as "L-36" (which contains 5% of stabilizer in polypropylene), sold by Montecatini. The mixture was passed through a Pallman pulverizer and extruded in the following conditioning:

Extrusion apparatus: As described in C.P. 793,193 by Killoran et al., having 100 orifices, each orifice having 0.012 inch diameter.
Temperature: 256° C.
Debit: 18.5 g./min.
Vacuum: 20 inches mercury
Size of filters preceding the spinneret: 30–80–30–100–30–325–30 mesh The screw thrust started at 570 lb. and did not rise during a period of 1 hour as measured by "Honeywell Pressure Recorder."

Sample 1

The same was repeated without agents forming non-oxidizing gases. The screw thrust at the beginning was 590 lbs. and within an hour, rose to 612 lbs. Examination of the filters shows plugging by oxidized polymer with the formation of gels and degradated polypropylene. The product was much less uniform than with Example I.

The same as in Example 1 was repeated but varying the degree of vacuum during the extrusion process. As a result, the beneficial effect encountered at the beginning of the reaction was nullified and what has been said of Sample 1 holds here.

The pigment formula used for carrying these examples was the following:

Pigments:
   PV Fast Yellow HR 0.5%
   Cromophtal Green GF 0.0055%
   PV Fast Red H4B 0.01%
   Black 10R 0.05% the percent being based on polypropylene.

The embodiments of the invention in which an exclusive property or privilege is claimed are defined as follows:

1. A melt-extrusion process having reduced tendency to oxidize an oxidizable melt-extrudable fragmented polymeric material slected from the group consisting of polyolefins, polyacetals, polyesters, polyamides and cellulose esters, the improvement which comprises feeding in a melt-extrusion apparatus at least one oxidizable melt-extrudable polymeric material in fragments and an agent, decomposing said agent between about room temperature and 50° C. below the softening point of said polymeric material, so as to release non-oxidizing gases, said polymeric material fragments being impermeable to said agent and said non-oxidizing gases, whereby prior to the melting of said fragments, but during heating of the said fragments, the said agent releases the said non-oxidizing gases which move in between and around said fragments, the said fragments being unmolten, but upon further heating, the fragments melt and thereby offer substantially a gas impermeable zone, which compels said non-oxidizing gases to move away from the melting zone into said unmolten fragments and thus to sweep away oxidizing gases adjacent to said melting zone.

2. The process according to claim 1 wherein said agent is ammonium bicarbonate.

3. The process according to claim 1 wherein said polymeric material is a high molecular weight stereoregular polyolefin.

4. The process according to claim 1 wherein said polymeric material is stereoregular isotactic polypropylene.

5. A continuous process for the melt-extrusion of polypropylene into products having funicular structures, said process characterized by a substantial reduction of gels and other degradation products and being of substantial denier uniformity, said process which comprises feeding in a melt-extrusion apparatus making funicular structure, melt-extrudable polypropylene fragments and an agent, decomposing said agent between about room temperature and 50° C. below the softening point of said polypropylene fragments, so as to release non-oxidizing gases, said polypropylene fragments being impermeable to said agent and said non-oxidizing gases, whereby prior to the melting of said fragments, but during heating of the said fragments, the said agent releases the said non-oxidizing gases which move in between and around said fragments, the said fragments being unmolten, but upon further heating, the fragments melt and thereby offer substantially a gas impermeable zone, which compels said non-oxidizing gases to move away from the melting zone into said unmolten fragments and thus to sweep away oxidizing gases adjacent to said meltting zone, while the molten polypropylene in said melting zone continuously moves away from the unmolten fragments to be shaped into a product having funicular structure.

References Cited

UNITED STATES PATENTS

| | | | |
|---|---|---|---|
| 3,026,272 | 3/1962 | Rubens et al. | 260—2.5E |
| 3,072,972 | 1/1963 | Yokose et al. | 260—2.5E |
| 3,089,857 | 5/1963 | Pottenger | 264—54 |
| 3,118,161 | 1/1964 | Crampton | 264—54 |
| 3,150,214 | 9/1964 | Scalora et al. | 260—2.5E |
| 3,214,234 | 10/1965 | Bottomley | 264—54 |
| 3,341,481 | 9/1967 | Palmer | 264—54 |
| 3,344,092 | 9/1969 | Pavuk | 260—2.5E |
| 3,422,171 | 1/1969 | Oppenlander | 264—54 |
| 3,474,050 | 10/1969 | Chappelear et al. | 260—2.5E |
| 3,504,399 | 4/1970 | Wolf | 18—12 |

FOREIGN PATENTS

40/1810  2/1965  Japan.

JAY H. WOO, Primary Examiner

U.S. Cl. X.R.

264—211